Nov. 25, 1969  V. SCHOMBER  3,480,006
PHYSIOLOGICAL VOLUME-PRESSURE DIAGRAM RECORDING DEVICE
Filed Sept. 24, 1965
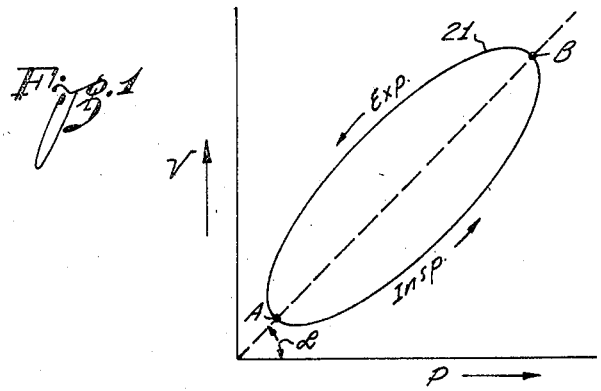
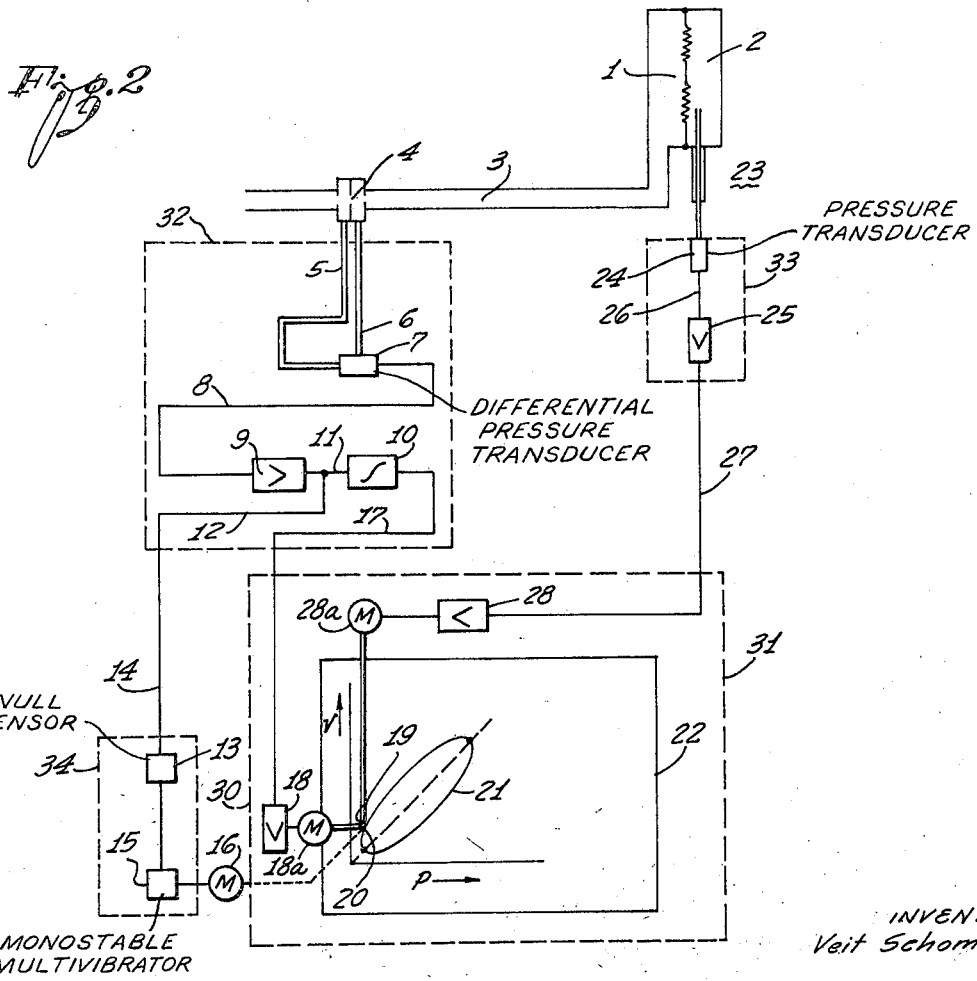
INVENTOR
Veit Schomber
By Jerome B. Rockwood
Agent United States Patent Office 3,480,006
Patented Nov. 25, 1969

3,480,006
PHYSIOLOGICAL VOLUME-PRESSURE DIAGRAM
RECORDING DEVICE
Veit Schomber, Freiburg im Breisgau, Germany, assignor
to Fritz Hellige & Co. G.m.b.H., Freiburg im Breisgau,
Germany
Filed Sept. 24, 1965, Ser. No. 489,845
Claims priority, application Germany, Sept. 28, 1964,
H 53,884
Int. Cl. A61b 5/08
U.S. Cl. 128—2.08                                      5 Claims

ABSTRACT OF THE DISCLOSURE

A device for recording the volume-pressure relationship of the lungs. The volume of air inhaled and exhaled is measured by an orifice velocity meter in the breath flow path. The velocity representing output of the orifice meter is integrated to determine volume, and applied to the Y axis motor of an X–Y recorder. A manometer in the thorax provides a pressure representing signal which is applied to the recorder X axis motor. Elasticity of the lung, indicated by the line through the reversal points of the volume-pressure diagram, is measured by sensing the null during reversals of breath flow. The null indicator triggers a monostable multivibrator which provides a distinctive signal to the recording pen.

Within the area of contemporary diagnostic techniques for determining the function of human lungs, it was found of importance to take into account the analysis of the phenomena occurring with the action of breathing, in addition to numerous other criteria. Specifically, a significant factor indicative of efficient lung function is the elasticity of the thorax and of the lung, so that the efficiency of the lung regresses as a result of loss of elasticity, such as that caused by emphysema. Conclusions may be drawn from such investigation of the organs involved in the process.

For the specific purpose of diagnosis, it is important to determine the work done in the breathing process, as well as the elasticity of the lung. Therefore, these magnitudes are recorded in a pressure-versus-volume diagram consisting of an orthogonal coordinate system in which pleural pressure is represented as a function of that breathing volume which is displaced by the lung.

FIGURE 1 illustrates a respiration pressure-volume diagram with the lung resilience axis determined by reversal points A and B, and FIGURE 2 illustrates the recording device of the present invention for tracing the diagram of FIGURE 1.

For further explanation, reference is made to FIGURE 1, which illustrates such pressure versus volume diagram for one complete breathing cycle including an inhaling phase and an exhaling phase. In this diagram, the pressure is indicated along the abscissa and the breathing volume is entered as the ordinate. Consequently, the area encompassed by the plot 21 represents the work done during the breathing cycle. By way of example, the pleural pressure could be measured directly by using appropriate surgically inserted manometers and then corresponding values would be entered in the diagram. However, a proportional magnitude may be supplied in the form of the pressure within the esophagus because the esophagus is exposed to the same forces as is the pleural cavity.

Particular importance is attributed to the points of reversal designated A and B in the work diagram 21, these points representing the change of phase between inhalation and exhalation. At the moments represented by these points, all dynamic resistances of the lung and bronchial system disappear so that the existing force is supplied by the elasticity of the lung exclusively. Similarly, the gradient of the line through the two points is of particular significance because it indicates the ability of the lung to expand (tan $\alpha = V/P$), an analogy to the reciprocal of the spring constant, or compliance, of a spring. The tangent of the angle $\alpha$ between the pressure axis and the line determined by the reversal points A and B provides an indication of the resiliency of the lung tissue. Healthy tissue is more resilient, and tan $\alpha$ is larger.

In the course of practical applications of such system, it was found that it is difficult to determine the location of points A and B along the pressure versus volume plot, as a result of strong vibrations such as those caused by the heartbeat. Then, those magnitudes which are indicative of the ability of the lung to expand cannot be determined without considerable errors.

In accordance with one of the objects of the present invention, this shortcoming is eliminated in accordance with the fundamental concept of the invention, since the points of transition A and B on pressure versus volume plot 21, as located between inhalation and exhalation phase are recorded to become visible, and this is done by means based on the fact that the breathed air passes through a condition of zero flow velocity.

A realization of this concept and the results obtained are further illustrated in connection with FIGURE 2. This figure shows a schematic representation of recording equipment for determining the work done by the lung, the equipment employing the concept of this invention. The volume enclosed by the lung is schematically designated by numeral 1. This volume is connected with the ambient atmosphere through respiration channel 3. The breathing volume is determined, for example in accordance with the principle of Pneumotachography by means of an orifice velocity meter 4 which is inserted into the flow path of the breathed air. The orifice velocity meter 4 includes a differential manometer in which the different pressures occurring ahead and behind of an apertured diaphragm, over pressure leads 5 and 6, produce an electrical magnitude which is proportional to the pressure difference, which is effected within a differential pressure transducer 7. The output from the differential pressure transducer 7 is connected, over lead 8, to the input of a carrier frequency amplifier 9. The electrical magnitude which is porportional to the flow velocity and which appears at the output of the carrier frequency amplifier 9 is integrated in an integrating circuit 10, the output of which supplies a magnitude which is a function of displaced breathing volume. This magnitude is employed for controlling a servo motor 18a, the motor operating to set into motion the writing instrument 19 of the recorder 30 in the direction of the ordinate and as a function of volume fluctuations. Generally, a power amplifier 18 is connected ahead of the servo motor.

The dynamic pleural pressure or the esophagus pressure proportional to it, each of which is a function of the lung volume at a given time, is recorded in the direction of the other diagram axis which is the abscissa. For this purpose, a pressure sensitive probe 23 is inserted into the esophagus, with a pressure transducer 24 being connected to it. The transducer 24 supplies, at its output terminal, an electrical magnitude which is proportional to the pressure in the esophagus, which magnitude upon amplification by carrier frequency amplifier 25 controls servo motor 28a over lead 27 to achieve motion of the writing instrument 19 in the direction of the abscissa and in accordance with pressure fluctuations. Consequently, within one breathing cycle, a pressure versus volume plot is in accordance in the form of loop 21, the area enclosed by the loop being proportional to the work done by the lung. The two points of reversal A and B of the loop 21 correspond to the transition from inhalation to exhalation, and vice versa, with the velocity of breathing flow being zero at these points. The line interconnecting the two points A and B characterizes, for every given moment of the breathing cycle, the elastic power of reaction of the lung, so that the coefficient of elasticity of the lung may be determined. It should be mentioned that, generally, a power amplifier 28 is connected ahead of servo motor 28a.

In order to determine with certainty the location of points of reversal A and B, and in accordance with the present invention, means are provided for automatically marking the points of reversal as represented by a zero breathing air velocity. As shown in the illustrated embodiment, the electrical magnitude which is available at the output terminals of carrier frequency amplifier 9 actuates a null sensor 13 over leads 11 and 12, the null sensor supplying a control pulse to a monostable multivibrator 15 over lead 14 as each transition through the zero point between phases occurs. The multivibrator 15 is therefore put into its astable condition, generating a pulse which applies a control current to the servo motor 16, which effects a motion to produce a marking by the writing instrument 19, as writing pen 20. Appropriately, the plot 21 may simply be interrupted at the points A and B and this can be mechanized in such a manner that servo motor 16 operates to lift the writing instrument 19 and pen 20. Thus, duration of the astable condition of multivibrator 15 controls the duration of interruption of plot recording.

Two-coordinate recording instruments such as that enclosed within the dashed line 31, form part of the prior art so that there is no need for a detailed discussion of the structure and mode of operation thereof. Generally, the amplifiers 18 and 28 and the associate servo motors 18a and 28a which operate to transform the amplified electrical signals into corresponding two-dimensional motion of the writing instrument 19, 20 are built into the device. Likewise, the equipment 32 for measuring displaced breathing volume and the measuring equipment 33 for determining the esophagus pressure may form separate units; or they may be combined within one unit. Furthermore, the additional device in accordance with the invention including the null indicator 13 and the monostable multivibrator 15 may be combined to form an additional separate unit 34, or may be combined with one of the two units 31 or 32. Of course, the element 16 operating to lift the writing instrument is suitably built into the two-coordinate recorder.

As a result of the improved method as mechanized by the present invention, the points of reversal between inhalation and exhalation phase of lung activity may be determined with certainty and therewith determination of lung elasticity as a significant magnitude for the purpose of diagnosis is possible. This fact considerably facilitates diagnostic exploitation of the recording.

What is claimed is:

1. A physiological volume-pressure diagram recording device comprising: a two-coordinate recorder, pleural cavity pressure measuring means including a pressure transducer, a first amplifier connected to the output of the transducer, and servo motor means connected to said first amplifier for representing the magnitude of pleural cavity pressure by a linear deviation of a recording pen in said two-coordinate recorder in a first coordinate, a velocity meter in a respiration passage, a velocity transducer connected to said velocity meter, a second amplifier connected to said velocity transducer, an integrator connected to said second amplifier, servo motor means connected to said integrator for representing the volume of air by a linear deviation of said recording pen in a second coordinate direction, and a null indicator connected to the output of said second amplifier for supplying a marking pulse to said recording pen upon transition between inhalation and exhalation.

2. In the physiological volume-pressure diagram recording device of claim 1, said velocity transducer including an orifice velocity meter, a differential manometer connected to said velocity meter, and a differential pressure transducer mounted to said differential manometer.

3. In the physiological volume-pressure diagram recording device of claim 1, said null indicator including a null sensor connected to said second amplifier and a monostable multivibrator connected to said null sensor.

4. A physiological volume-pressure diagram recording device comprising respiration volume measuring means, pleural cavity pressure measuring means, a recorder having an abscissa drive servo motor connected to said pleural cavity pressure measuring means, an ordinate drive servo motor, and marking means, said respiration volume measuring means including a pneumotachograph for measuring the velocity of air in a respiratory passage and an integrator connected to said pneumotachograph, means connecting said ordinate drive servo motor to said integrator, a null sensor connected to said pneumotachograph to provide a signal representing zero air velocity, a monostable multivibrator connected to said null sensor, and means connected to said multivibrator and said marking means to indicate zero air velocity.

5. A physiological volume pressure diagram recording device comprising respiration volume measuring means, pleural cavity pressure measuring means, a recorder having an abscissa drive servo motor connected to said pleural cavity pressure measuring means, an ordinate drive servo motor and marking means, said respiration volume measuring means including respiration air velocity measuring means, an amplifier connected to said air velocity measuring means, and an integrator connected to said amplifier, means connecting said ordinate drive servo motor to said integrator, a null sensor connected to said amplifier to provide a signal representing zero air velocity, a monostable multivibrator connected to said null sensor, and means connected to said multivibrator for enabling said marking means to indicate zero air velocity at reversal points.

References Cited

FOREIGN PATENTS 850,750  10/1960  Great Britain.

RICHARD A. GAUDET, Primary Examiner

K. L. HOWELL, Assistant Examiner